(12) United States Patent
Thackeray et al.

(10) Patent No.: US 7,041,414 B2
(45) Date of Patent: May 9, 2006

(54) SILVER MANGANESE OXIDE ELECTRODES FOR LITHIUM BATTERIES

(75) Inventors: Michael M. Thackeray, Naperville, IL (US); John T. Vaughey, Elmhurst, IL (US); Dennis W. Dees, Downers Grove, IL (US)

(73) Assignee: The University of Chicago, Chicago, IL (US)

( * ) Notice: Subject to any disclaimer, the term of this patent is extended or adjusted under 35 U.S.C. 154(b) by 286 days.

(21) Appl. No.: 10/338,175

(22) Filed: Jan. 7, 2003

(65) Prior Publication Data

US 2004/0048155 A1    Mar. 11, 2004

Related U.S. Application Data

(60) Provisional application No. 60/409,609, filed on Sep. 10, 2002.

(51) Int. Cl.
*H01M 10/32* (2006.01)
(52) U.S. Cl. .................... 429/219; 429/218.1; 429/224
(58) Field of Classification Search ............. 429/218.1, 429/219, 224
See application file for complete search history.

(56) References Cited

U.S. PATENT DOCUMENTS

| | | | | |
|---|---|---|---|---|
| 3,977,899 A | * | 8/1976 | Takeda | 429/320 |
| 6,221,530 B1 | * | 4/2001 | Turner et al. | 429/229 |
| 2003/0008210 A1 | * | 1/2003 | Licht | 429/219 |
| 2003/0124422 A1 | * | 7/2003 | Cintra et al. | 429/209 |

* cited by examiner

*Primary Examiner*—Dah-Wei Yuan
(74) *Attorney, Agent, or Firm*—Emrich & Dithmar LLC

(57) ABSTRACT

This invention relates to electrodes for non-aqueous lithium cells and batteries with silver manganese oxide positive electrodes, denoted $Ag_xMnO_y$, in which x and y are such that the manganese ions in the charged or partially charged electrodes cells have an average oxidation state greater than 3.5. The silver manganese oxide electrodes optionally contain silver powder and/or silver foil to assist in current collection at the electrodes and to improve the power capability of the cells or batteries. The invention relates also to a method for preparing $Ag_xMnO_y$ electrodes by decomposition of a permanganate salt, such as $AgMnO_4$, or by the decomposition of $KMnO_4$ or $LiMnO_4$ in the presence of a silver salt.

13 Claims, 10 Drawing Sheets

US 7,041,414 B2

SILVER MANGANESE OXIDE ELECTRODES FOR LITHIUM BATTERIES

RELATED APPLICATIONS

This application, pursuant to 37 C.F.R. 1.78(c), claims priority based on provisional application Ser. No. 60/409,609 filed on Sep. 10, 2002.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF INVENTION

This invention relates to electrochemical cells and batteries and more particularly to improved positive electrode materials for non-aqueous lithium cells and batteries. The positive electrodes consist of silver-manganese-oxide compounds or composite materials. The predominant, but not exclusive, field of use of these electrodes is for primary (non-rechargeable) lithium batteries with particular emphasis on powering medical devices such as cardiac pacemakers, defibrillators and medical pumps.

BACKGROUND OF THE INVENTION

State-of-the-art cardiac defibrillators are powered by lithium batteries in conjunction with electrolytic capacitors. The batteries contain a metallic lithium negative electrode, a silver-vanadium oxide positive electrode and a non-aqueous liquid electrolyte consisting of a lithium salt such as $LiAsF_6$ dissolved in an organic solvent, such as propylene carbonate. Silver vanadium oxide electrodes are well known in general for lithium batteries, as described in U.S. Pat. Nos. 4,310,609 and 4,391,729 that disclose the use of an electrochemical cell having as its positive electrode a composite oxide matrix consisting of a vanadium oxide chemically reacted with a group IB, IIB, IIIB, IVB, VB, VIB, VIIB and VIII metal, and most specifically with a silver containing compound. U.S. Pat. No. 4,391,729 also discloses a method of making such a cathode. The current positive electrode of choice is $Ag_2V_4O_{11}$. $Li/Ag_2V_4O_{11}$ cells discharge by an electrochemical process that involves lithium insertion into the crystal lattice of $Ag_2V_4O_{11}$ with a simultaneous reduction of the silver ions and their concomitant extrusion from the crystal lattice; thereafter, lithium insertion is accompanied by a concomitant reduction of the vanadium ions within the structure, ideally from $V^{5+}$ to $V^{4+}$. Thus the reaction can be broadly defined in the ideal case as taking place in main two steps:

  (Step 1: Silver displacement)

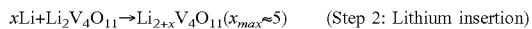  (Step 2: Lithium insertion)

One of the major limitations of $Li/Ag_2V_4O_{11}$ cells is that they lose their capability of providing the necessary power particularly after the reaction described in Step 1 has occurred, and when cells are allowed to stand for prolonged periods of time. It is believed that this loss in power may be attributed, at least in part, to the $Ag_2V_4O_{11}$ positive electrode, and in particular, that it may be attributed to the fact that at the end of Step 1, a metastable phase of composition $Li_2V_4O_{11}$ is formed. This metastability is reflected by the fact that it has not been possible to synthesize a $Li_2V_4O_{11}$ phase that is isostructural with $Ag_2V_4O_{11}$ by independent chemical methods in the laboratory. Attempts to synthesize a $Li_2V_4O_{11}$ phase in the laboratory, for example, by reacting $Ag_2V_4O_{11}$ with n-butyllithium, have failed; these attempts have always yielded other stable lithium-vanadium-oxide phases such as $LiVO_3$ and $LiV_3O_8$. This finding indicates that the power fade may at least be partly attributed to a decay of the "$Li_2V_4O_{11}$" phase that is generated electrochemically during Step 1 into other more stable lithium-vanadium-oxide compounds.

$Li/Ag_2V_4O_{11}$ lithium cells can therefore deteriorate prematurely and are unable to deliver acceptable pulse power before the cells have reached the end of their expected calendar (shelf) and operating life. It can therefore be readily understood that such limitations of $Li/Ag_2V_4O_{11}$ cells are of great concern when used to power implantable devices such as cardiac defibrillators in the human body. Such limitations negatively affect product reliability and necessitate a continual monitoring of the cells while implanted in patients to ensure a timely replacement of the cells before they prematurely reach the end of discharge. There is therefore a great need to improve the electrochemical properties and operating life of silver-vanadium-oxide electrodes for lithium cells and batteries, particularly for use in life-supporting medical devices.

SUMMARY OF THE INVENTION

This invention relates to electrodes for non-aqueous lithium cells and batteries. More specifically, the invention relates to silver manganese oxide positive electrodes, $Ag_xMnO_y$, that can be used as alternative electrodes to replace state-of-the-art silver vanadium oxides, in which x and y are selected such that the manganese ions in the charged or partially charged electrodes cells have an average oxidation state greater than 3.5, preferably greater than 3.8, and more preferably greater than 3.9. The electrodes have application in lithium cells that contain metallic lithium or a lithium-containing compound as the negative electrode, and a non-aqueous electrolyte. The silver manganese oxide electrodes can optionally contain silver powder and/or silver foil to assist in current collection at the electrodes and to improve the power capability of the cells or batteries. The invention relates also to a method for preparing $Ag_xMnO_y$ electrodes by decomposition of a permanganate salt, such as $AgMnO_4$, or by the decomposition of $KMnO_4$ or $LiMnO_4$ in the presence of a silver salt.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENTS

Figure 1:
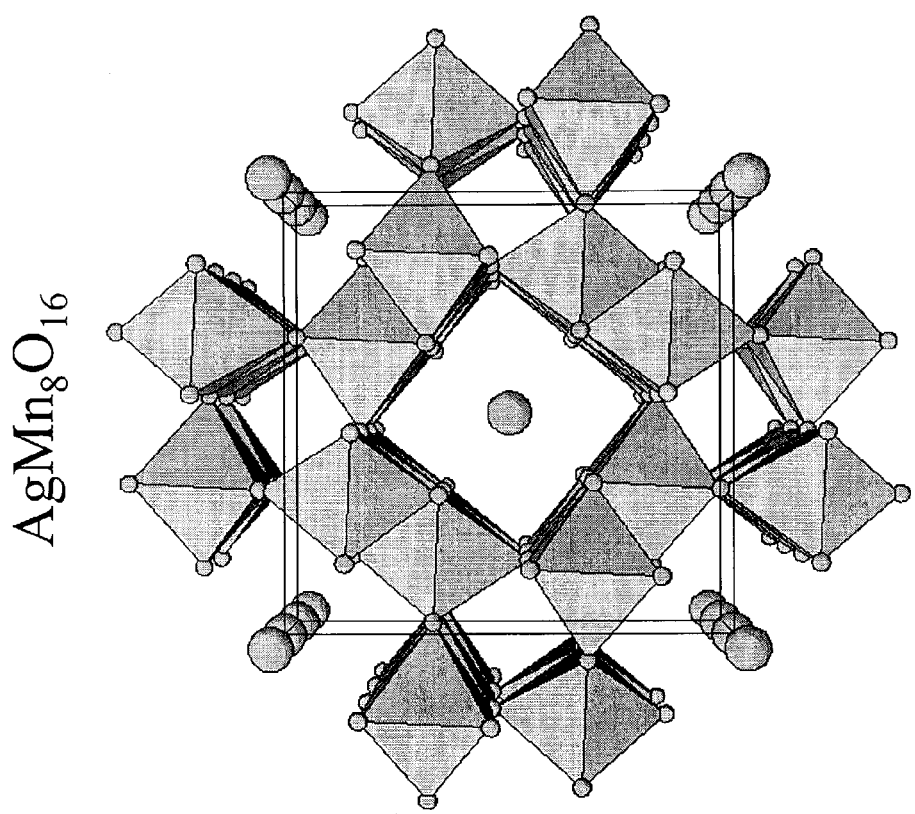
FIG. 1 is a schematic illustration of the $AgMn_8O_{16}$ structure.

State-of-the-art lithium batteries that are used for cardiac pacemaker applications commonly use iodine (in the form of polyvinylpyrrolidone (PVP)/I$_2$) as the positive electrode, whereas the most common positive electrode for defibrillators is silver vanadium oxide, Ag$_2$V$_4$O$_{11}$ (SVO); a less common positive electrode for medical lithium batteries is heat-treated gamma-MnO$_2$. It is known that lithium cells with SVO electrodes decay on standing over a period of time and once they are discharged to approximately 2.6 V vs. metallic lithium an increase in cell impedance can damage the performance of the lithium cells. Such a limitation is a major disadvantage when cells are implanted into the human body and surgery is required to replace the batteries. The exact reason for the decay in the performance of Li/SVO cells is presently unknown. It has been proposed that the decay of Li/SVO cells and the impedance rise is at least partly associated with an instability of the lithiated silver vanadium oxide electrode.

This invention addresses the need for finding more stable positive electrodes to replace SVO in medical lithium batteries. It relates specifically to silver manganese oxide electrodes. An added benefit to using silver manganese oxides over silver vanadium oxides is that manganese oxides are more environmentally acceptable than vanadium oxides. For example, although both MnO$_2$ and V$_2$O$_5$ are powerful oxidizing agents, V$_2$O$_5$ is a more highly toxic irritant than MnO$_2$. Moreover manganese oxide electrodes tend in general to provide higher discharge voltages than vanadium oxides.

The silver manganese oxide electrodes of this invention consist of a compound or a composite matrix or structure in which either silver metal and/or a silver oxide component exists with manganese oxide in either a fully or partially oxidized state. According to the invention, therefore, the silver manganese oxide electrode can be formulated as having the general formula Ag$_x$MnO$_y$ in which x and y are selected such that the manganese ions in charged or partially charged lithium cells have an average oxidation state greater than 3.5, preferably greater than 3.8, and more preferably greater than 3.9. Examples of such electrodes, therefore, include composite materials between metallic silver and manganese dioxide, represented generically as xAg.MnO$_2$ or between silver oxide and manganese dioxide, represented ideally as Ag$_2$O.MnO$_2$ in which the manganese ions are tetravalent, and in which the oxidation state of the silver ions is zero and one, respectively. Electrodes with an Ag$_2$O component have higher capacities than those with an Ag component because Ag$_2$O can be reduced and can contribute to the capacity of the electrode, whereas Ag is electrochemically inactive, but can contribute significantly to the electronic conductivity of the electrode. The composite electrodes can also be a combination of xAg.MnO$_2$ and Ag$_2$O.MnO$_2$. In such composite materials, which represent the charged positive electrodes of the lithium cell, the oxygen content can be lowered and the manganese oxidation state reduced, depending on the processing conditions used in the synthesis of the electrodes. It is preferable to keep the oxidation state of the silver and manganese ions in the charged Ag$_x$MnO$_y$ electrode as high as possible without compromising its stability to the electrolyte with which it is in contact in the electrochemical cell. Thus, the invention extends to include partially reduced silver manganese oxides as charged electrodes. For example, such charged electrodes can be represented generically as Ag$_z$MnO$_2$, in which z is less than 0.5, in accordance with the principles of this invention in keeping the oxidation state of the manganese ions above 3.5.

In a first embodiment, this invention relates to silver-manganese oxide positive electrodes of general formula Ag$_x$MnO$_y$ for a non-aqueous lithium electrochemical cell, in which x and y are such that the manganese ions in the charged or partially charged electrodes have an average oxidation state greater than 3.5, preferably greater than 3.8, and more preferably greater than 3.9.

It has been previously demonstrated in U.S. patent application Ser. No. 10/338,507, filed Jan. 7, 2003, entitled ELECTRODE FOR A LITHIUM CELL, filed concurrently herewith, that the electrochemical performance of silver vanadium oxides such as AgV$_3$O$_8$ and Ag$_2$V$_4$O$_{11}$ can be improved if the silver vanadium oxide electrode powders are intimately mixed with silver powder to improve the electronic current collection in the electrode. Therefore, in a second embodiment of this invention, the Ag$_x$MnO$_y$ electrodes can be mixed with Ag powder which serves as an additional current collector to carbon powder (typically acetylene black) which is conventionally present with metal oxide electrodes in lithium cells. It is believed that the Ag powder act as nucleating sites for the silver metal that is extruded from the Ag$_x$MnO$_y$ electrodes during discharge, thereby enhancing the current collection at the electrode and the power capability of the cell. Alternatively, when laminated electrodes are used, silver foil is useful as the current collector onto which the electrochemically active Ag$_x$MnO$_y$ electrode powder is cast.

In a third embodiment of this invention, the Ag$_x$MnO$_y$ electrodes may be prepared by the decomposition of a permanganate precursor optionally in the presence of silver components or compounds or manganese components or compounds. The permanganate precursor is preferably silver permanganate, AgMnO$_4$, which contains both silver and permanganate components. When other permanganate precursors are used, the decomposition must necessarily occur in the presence of a silver component or compound to introduce the silver component into the resulting Ag$_x$MnO$_y$ product. In a fourth embodiment of the invention, the permanganate precursor is selected preferably from potassium permanganate, KMnO$_4$, sodium permanganate, NaMnO$_4$, and lithium permanganate, LiMnO$_4$, and the silver compound is selected preferably from silver nitrate, AgNO$_3$, or a silver oxide, such as Ag$_2$O. Although silver permanganate, potassium permanganate, sodium permanganate and lithium permanganate have been selected as the preferred permanganate precursors, and AgNO$_3$ and Ag$_2$O selected as the preferred silver precursors, it will be appreciated by those skilled in the art that other permanganate and silver precursors could be used to prepare the Ag$_x$MnO$_y$ electrodes.

The decomposition of the permanganate precursor can occur, for example, by heating the permanganate and silver-containing precursors, preferably from solution to dryness, or when placed in contact with the electrolyte of the cell, such as 1 M LiPF$_6$ in ethylene carbonate:diethylcarbonate (1:1 mixture). When silver permanganate, $AgMnO_4$, is used as the only precursor, it contains both the silver and manganese components of the final $Ag_xMnO_y$ electrode. This $Ag_xMnO_y$ electrode can be prepared either by heating the precursor at moderate temperatures in air or oxygen, for example at 50–300° C., or by reaction of $AgMnO_4$ with the electrolyte of the lithium electrochemical cell. In a fifth embodiment of the invention, the permanganate precursor can be decomposed in the presence of silver and/or manganese components or compounds such as $AgNO_3$, $Ag_2O$, $Mn(NO_3)_2$, $MnSO_4$, $Mn_2O_3$ or $MnO_2$ or the like to tailor the Ag:Mn ratio in the $Ag_xMnO_y$ electrode, and hence the capacity of the electrode. Because reactions between the precursor materials can be water-based, the soluble products of the reaction, such as $KNO_3$, $K_2SO_4$, or $LiNO_3$ can be easily removed by filtration to yield the final solid $Ag_xMnO_y$ electrode product, which is then dried prior to cell assembly. In practice, the applicants believe that the manganese ions in the product may be partially reduced during the reaction to a value slightly below 4, and that some of the silver ions may be reduced to the metallic state. However, in this respect, a major advantage of using permanganate precursors such as $AgMnO_4$, $KMnO_4$, $NaMnO_4$ and $LiMnO_4$ is that these precursors are extremely strong oxidizing agents, so that during their decomposition in the presence of a silver compound or salt at moderately high temperatures for example, 50–300° C., they will retard the reduction of the silver ions to silver metal, thereby producing $Ag_xMnO_y$ electrodes with as high a theoretical capacity as possible. Moreover, such decomposition reactions can lead to $Ag_xMnO_y$ products that have high surface area and are amorphous to X-rays. Such electrode products can therefore be expected to yield superior discharge capacities and power capabilities compared to more crystalline $Ag_xMnO_y$ compounds, such as $AgMn_8O_{16}$ that has a hollandite-type $MnO_2$ framework structure, or composite $Ag_xMnO_y$ electrodes that consist of a silver-containing component and a crystalline $MnO_2$ component.

Discharge of $Li/Ag_xMnO_y$ electrodes is believed to occur by a similar two-stage mechanism that characterizes conventional $Li/Ag_2V_4O_{11}$ cells. During the first step of the reaction, the silver ions are reduced to silver metal, and during the second stage the manganese ions are reduced, typically from a tetravalent state to a trivalent state. By way of comparison, for reaction with a well defined $Ag_xMnO_y$ structure such as $AgMn_8O_{16}$ in which the silver ions are contained within the interstitial sites of a hollandite-type $MnO_2$ framework structure shown in FIG. 1, lithium is first inserted into the $AgMn_8O_{16}$ structure with a concomitant reduction of the silver ions and their displacement from the structure:

$Li + AgMn_8O_{16} \rightarrow LiMn_8O_{16} + Ag$     (Step 1: Silver displacement)

Second, lithium continues to be inserted into the structure with a concomitant reduction of the manganese ions, preferably until the average manganese oxidation state reaches a value of 3 at x=7 ($LiMnO_2$):

$xLi + LiMn_8O_{16} \rightarrow Li_{1+x}Mn_8O_{16}$     (Step 2: Lithium insertion)

By analogy, the reaction with the $Ag_xMnO_y$ electrodes of the present invention can be envisaged to follow the reaction sequence:

$xLi + Ag_xMnO_y \rightarrow Li_xMnO_y + x\,Ag$     (Step 1: Silver displacement)

$zLi + Li_xMnO_y \rightarrow Li_{x+z}MnO_y$     (Step 2: Lithium insertion)

Because decomposed $AgMnO_4$ electrode products can be X-ray amorphous, thereby precluding any detailed structural information about the electrode, the applicants believe that decomposition of $AgMnO_4$ produces a $Ag_xMnO_y$ product with nominal formula $0.5Ag_2O\cdot MnO_2$, according to the overall idealized reaction:

$AgMnO_4 \rightarrow 0.5Ag_2O\cdot MnO_2 + 3/2 O_2$.

During this decomposition reaction, the manganese ions are reduced from an average oxidation state of 7 to an average oxidation state of 4. In practice, the applicants believe that at least some of the manganese ions may maintain an average oxidation state above 4, that is between 4 and 7. Such a $0.5Ag_2O\cdot MnO_2$ electrode can therefore discharge in accordance with the reaction processes described above for $Ag_xMnO_y$ electrodes:

$Li + 0.5Ag_2O\cdot MnO_2 \rightarrow 0.5Li_2O\cdot MnO_2 + Ag$     (Step 1: Silver displacement)

$Li + 0.5Li_2O\cdot MnO_2 \rightarrow 0.5Li_2O\cdot LiMnO_2$     (Step 2: Lithium insertion)

The theoretical capacity for such a $0.5Ag_2O\cdot MnO_2$ electrode, when discharged after the extrusion and reduction of silver to an average manganese oxidation state of 3, is 264 mAh/g, which compares favorably with the theoretical capacity of 315 mAh/g for a standard $Ag_2V_4O_{11}$ electrode (based on a maximum uptake of 7 lithium ions per formula unit). In practice, however, it is believed that the stoichiometry of the $Ag_xMnO_y$ products will deviate from the ideal $0.5Ag_2O\cdot MnO_2$ composition because it is likely the starting $Ag_xMnO_y$ electrode products will contain some reduced silver and manganese, thereby lowering the theoretical capacity of the electrode. Therefore, the applicants believe that the average oxidation state of the manganese ions in the $Ag_xMnO_y$ electrode products should be kept as high as possible, preferably greater than 3.5, more preferably greater than 3.8 and most preferably greater than 3.9.

The negative electrodes of the electrochemical cells of the present invention may be selected from any suitable lithium-containing compound known in the art, for example, metallic lithium, lithium alloys, lithium intermetallic compounds and lithiated carbon, such as lithiated graphite $Li_xC_6$ in which x can reach a typical value of 1. Preferably, the negative electrode is metallic lithium.

Likewise, the non-aqueous electrolyte may be selected from any suitable electrolyte salts and solvents that are known in the art. Examples of well known salts are $LiClO_4$, $LiAsF_6$, $LiPF_6$, $LiBF_4$ and $LiB(C_2O_4)_2$, and typical electrolyte solvents are propylene carbonate, ethylene carbonate, dimethyl carbonate, dimethyl carbonate, diethyl ether, dimethoxyethane and the like.

EXPERIMENTAL

The principles of this invention are provided by the following examples.

Synthesis and Preparation of Electrode Materials

EXAMPLE 1

Figure 2:
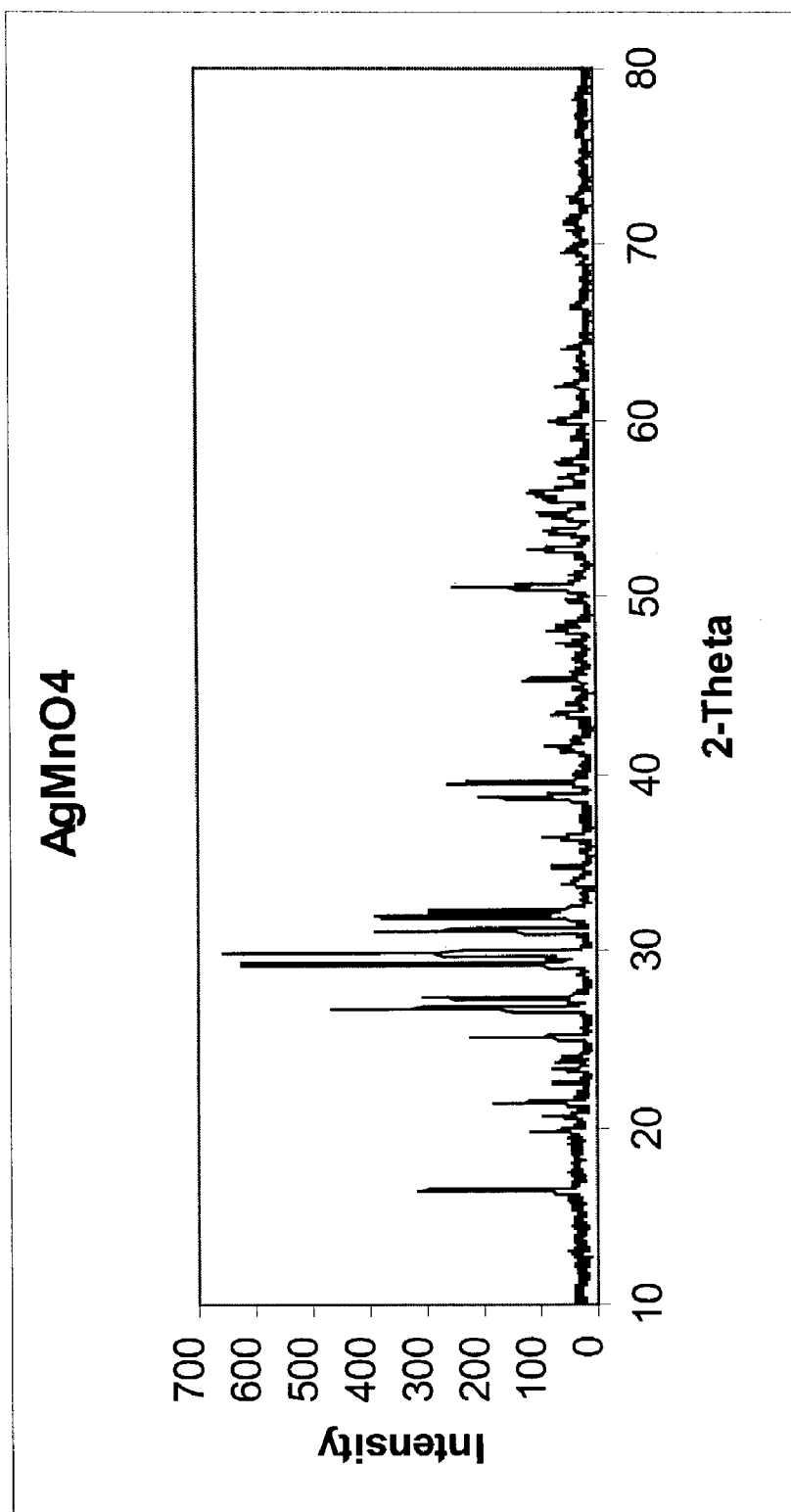
FIG. 2 is the X-ray diffraction pattern of $AgMnO_4$.
Figure 3:
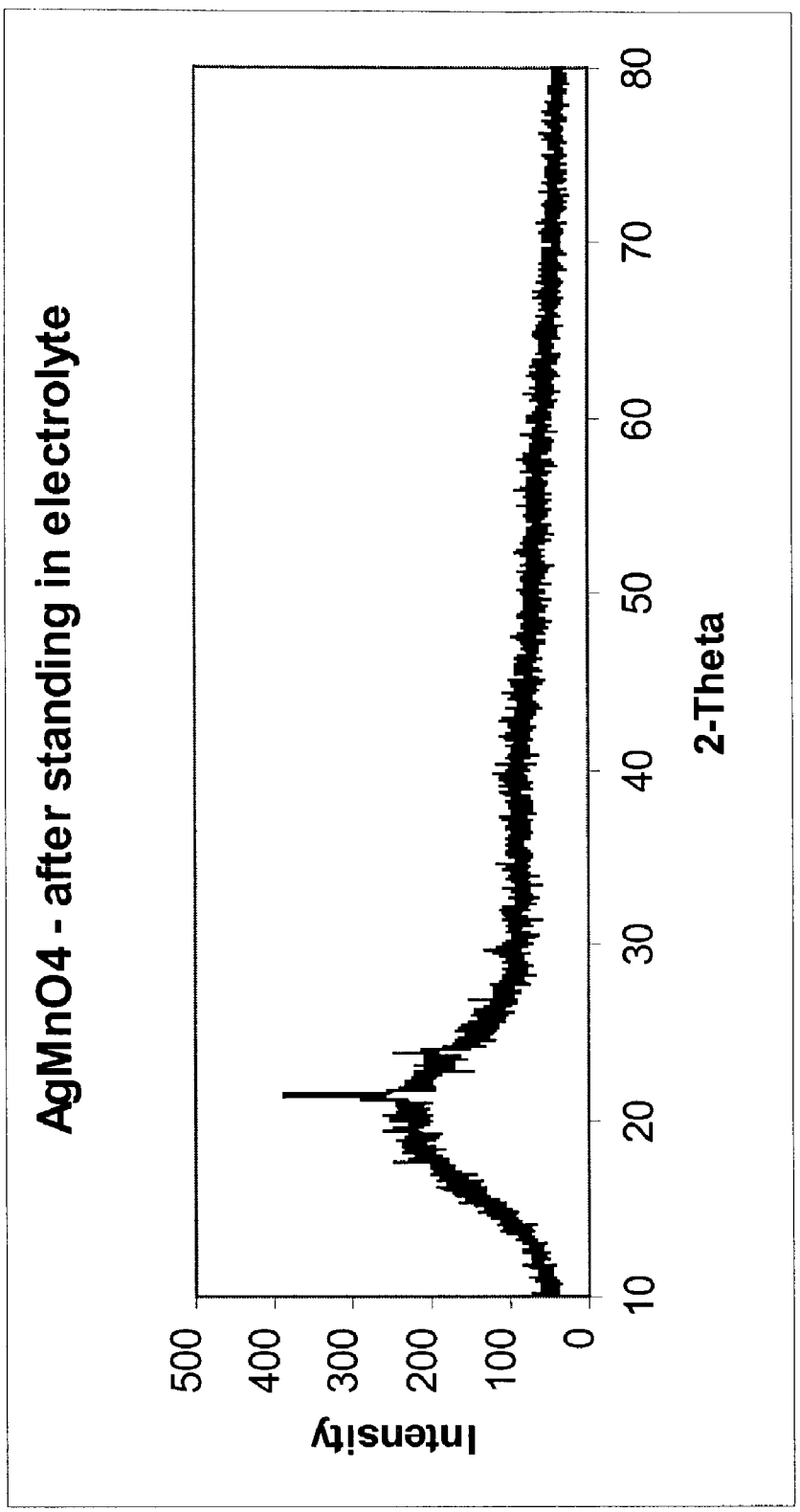
FIG. 3 is the X-ray diffraction pattern of a decomposed $AgMnO_4$ product.

An $Ag_xMnO_y$ electrode was prepared from a $AgMnO_4$ precursor supplied by Sigma-Aldrich Chemical Company. The powder X-ray diffraction pattern of this sample is shown in FIG. 2. The X-ray diffraction pattern of the $AgMnO_4$ precursor, after it had been soaked in a typical lithium battery electrolyte consisting of 1 M $LiPF_6$ in ethylene carbonate:diethylcarbonate (1:1 mixture), is shown in FIG. 3, showing that the $AgMnO_4$ precursor had decomposed into an unidentifiable, X-ray amorphous $Ag_xMnO_y$ product.

EXAMPLE 2

An $Ag_xMnO_y$ electrode was prepared by a redox reaction between $KMnO_4$ (Sigma-Aldrich Chemical Company) and $MnSO_4$ (Aldrich) at 50° C. a stirred solution containing $AgNO_3$ (Aldrich), and thereafter reducing the $AgNO_3$ component to Ag metal by adding zinc powder to the reactant solution. The idealized reaction between $MnSO_4$ and $KMnO_4$ can be represented:

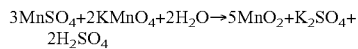

Figure 4:
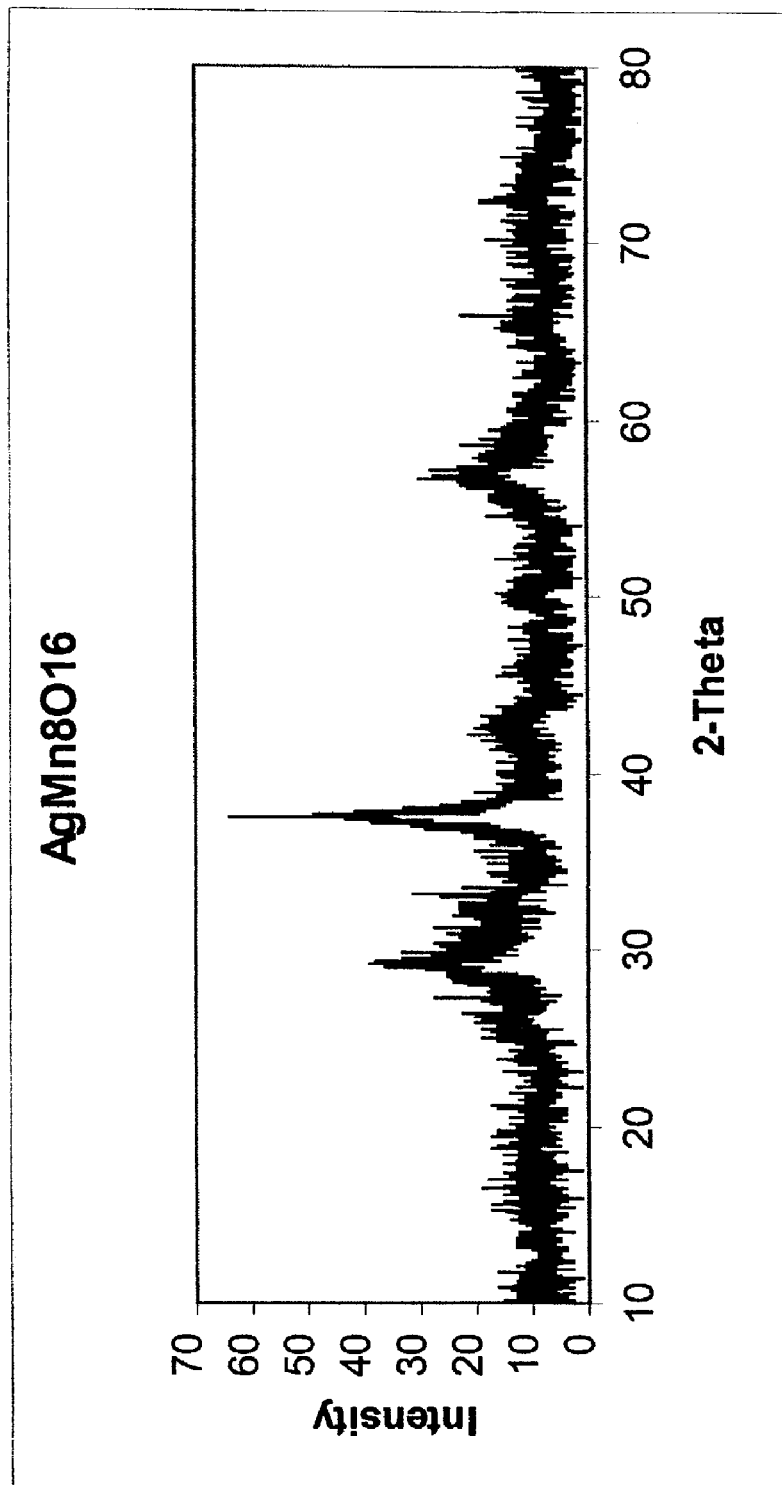
FIG. 4 is the X-ray diffraction pattern of a $Ag.MnO_2$ composite product.

The quantity of $AgNO_3$ was selected such that the Mn:Ag ratio in the final product was 8:1. In a typical experiment, the $KMnO_4$ was added to a solution of $MnSO_4$ and $AgNO_3$. Because zinc can reduce both silver and tetravalent manganese ions, the nominal formula of the reduced $Ag_xMnO_y$ electrode can be represented $Ag.8MnO_{2-\delta}$. The X-ray diffraction pattern in FIG. 4, shows that the manganese oxide component consisted of gamma-$MnO_2$-type and $Mn_2O_3$-type compounds, indicating that δ was greater than 0 but less than 0.5, such that the average oxidation state of the manganese ions in this $Ag_xMnO_y$ electrode was greater than 3 but less than 4.

EXAMPLE 3

Figure 5:
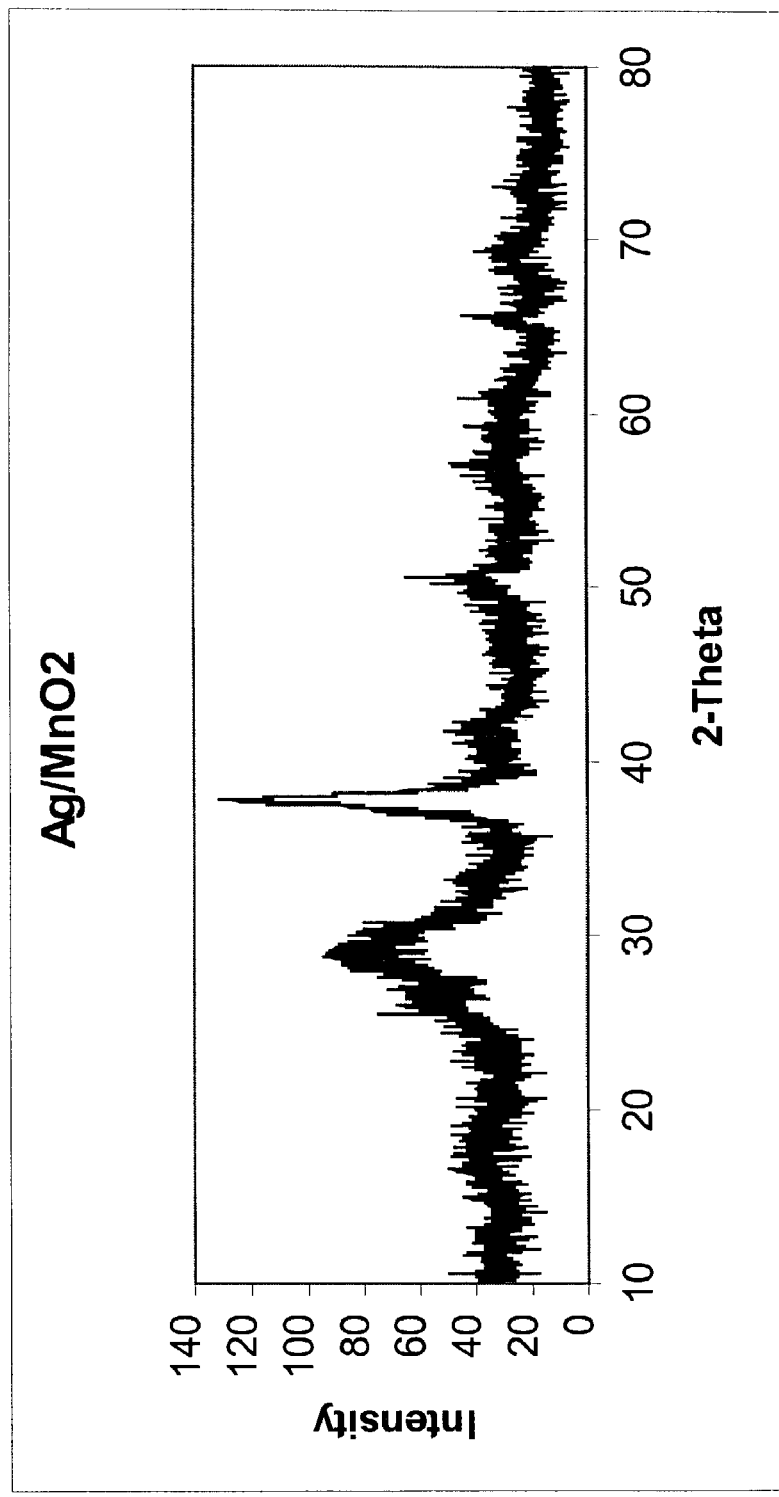
FIG. 5 is the X-ray diffraction pattern of a $AgMn_8O_{16}$ product.

An $Ag_xMnO_y$ electrode with nominal formula $AgMn_8O_{16}$ was prepared from a stoichiometric mixture of $AgNO_3$ (Aldrich) and electrolytically-prepared $MnO_2$ (Chemetals) powders which were ball-milled in methanol for two days, filtered, and fired in air at 400° C. for 24 hours. The powder X-ray diffraction pattern of the resulting $AgMn_8O_{16}$ product is shown in FIG. 5.

Electrochemical Evaluation

In general, the lithium cells were fabricated as follows. Positive electrode laminates were made by the following general procedure. The active electrode powders were sifted to <40 μm, mixed with 8 w/o carbon (acetylene black and SFG6 in a 50:50 ratio by mass) and 8 w/o polyvinlyidine difluoride (PVDF) binder and cast onto an Al foil with NMP dilutant. The cast laminate was subsequently dried at 70° C., and placed into a vacuum oven overnight. Coin cells of size 2032 (2.0 cm diameter, 3.2 mm high) were used for the electrochemical evaluations. The positive electrode consisted of a 1.6 cm diameter disc, punched from the laminate; a disc of metallic lithium, punched from lithium foil served as the negative electrode. Electrodes were insulated from one another by a porous Celgard separator of polypropylene. The electrolyte was 1 M $LiAsF_6$ dissolved in either propylene carbonate (PC) or a 50:50 mixture of PC and dimethoxyethane (DME). The electrochemical data were collected from pulsed-current discharge tests (one 10-second pulse of 1 $mA/cm^2$ every fifteen minutes) of button cells of size 2032 (2.0 cm diameter, 3.2 mm high) at 37° C. Cells were discharged in a pulse mode until the voltage at the end of the pulse reached at least 1.5 V.

EXAMPLE 4

Figure 6:
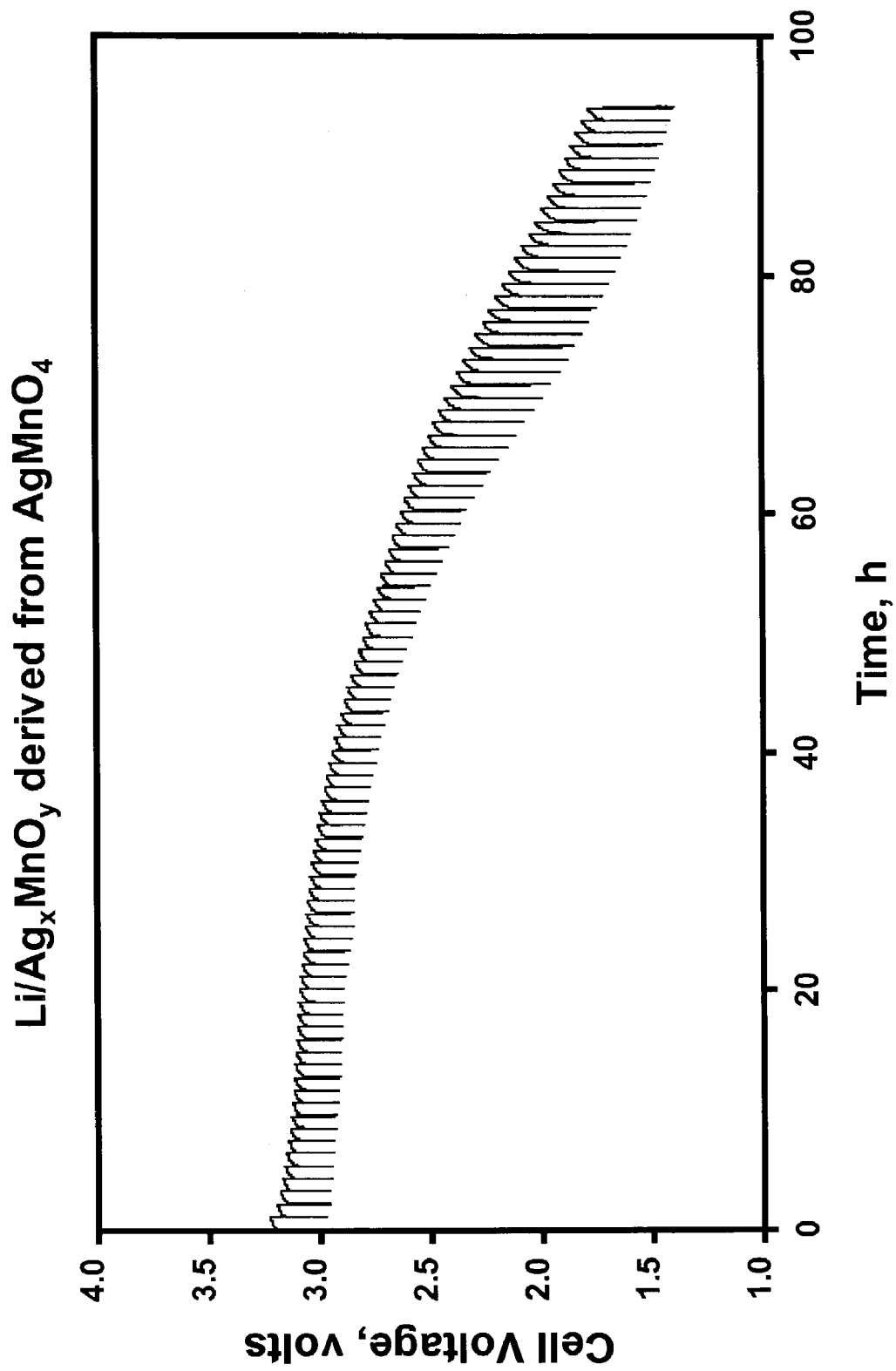
FIG. 6 is the electrochemical (pulsed current) profile for the discharge of a Li/Ag$_x$MnO$_y$ cell in which the Ag$_x$MnO$_y$ electrode was derived from AgMnO$_4$.

The 10-second pulse discharge profile of a lithium cell containing the $Ag_xMnO_y$ electrode from $AgMnO_4$ of Example 1 is shown in FIG. 6. The total electrode capacity, delivered to an end voltage of 1.7 V, was 230 mAh/g, which corresponded to a cell energy density of 2708 $mWh/cm^3$.

EXAMPLE 5

Figure 7:
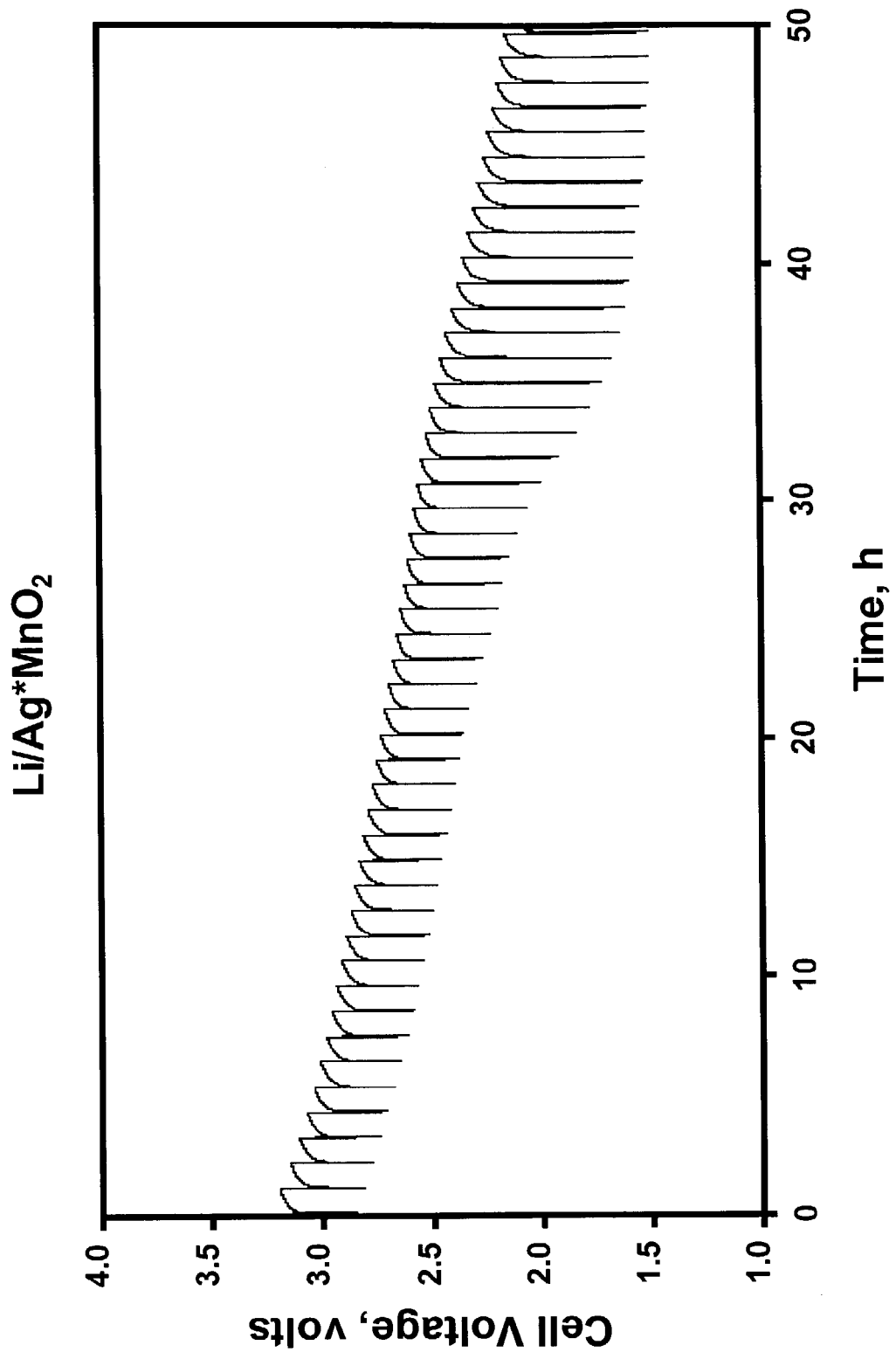
FIG. 7 is the electrochemical (pulsed current) profile for the discharge of a Li/Ag.MnO$_2$ cell.

The 10-second pulse discharge profile of a lithium cell containing the $Ag.MnO_{2-}$ electrode of Example 2 is shown in FIG. 7. The total electrode capacity, delivered to an end voltage of 1.7 V was 128 mAh/g, which corresponded to a cell energy density of 1837 $mWh/cm^3$.

EXAMPLE 6

Figure 8:
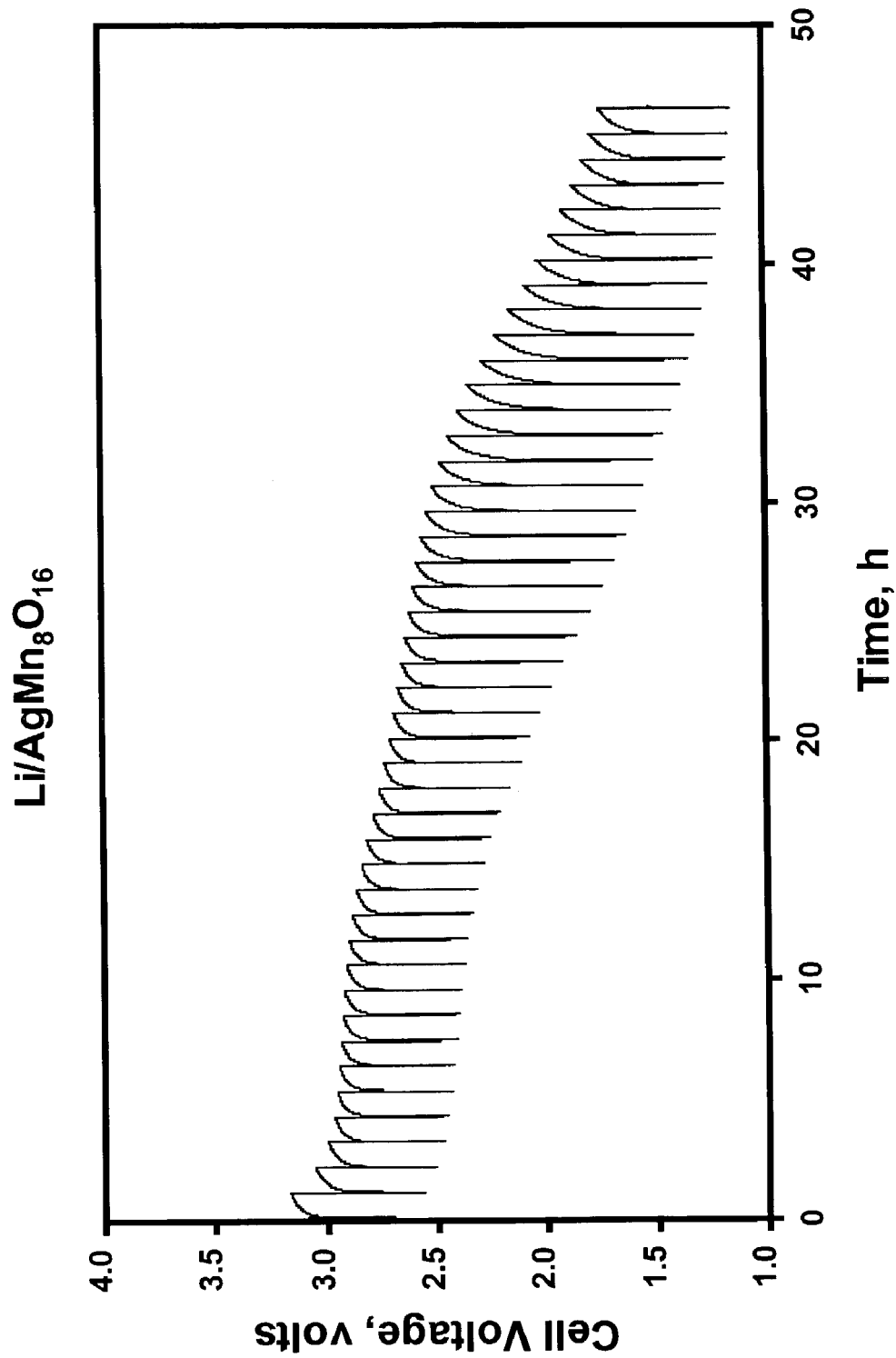
FIG. 8 is the electrochemical (pulsed current) profile for the discharge of a Li/AgMn$_8$O$_{16}$ cell.

The 10-second pulse discharge profile of a lithium cell containing the $AgMn_8O_{16}$ electrode of Example 3 is shown in FIG. 8. The total electrode capacity, delivered to an end voltage of 1.7 V, was 144 mAh/g, which corresponded to a cell energy density of 1831 $mWh/cm^3$.

The results of the electrochemical tests described in Examples 4, 5 and 6 are summarized in Table 1, which demonstrate the utility of the $Ag_xMnO_y$ electrodes of this invention. The results demonstrate that a $Ag_xMnO_y$ electrode prepared from a permanganate precursor, such as a silver permanganate precursor, provide a capacity close to its theoretical value. In particular, the $Ag_xMnO_y$ electrode of Example 4 that had been derived from $AgMnO_4$ and which was amorphous to X-rays (FIG. 3) provided 87% of its theoretical capacity of an $Ag_xMnO_y$ electrode based on the ideal and optimized formula $0.5Ag_2O.MnO_2$, implying that the average oxidation state of the manganese ions was between 3.8 and 3.9. Approximately 50% of this capacity was delivered above 3 V vs. metallic lithium, as reflected by the open circuit voltage after the pulse (FIG. 6). The reaction above 3 V was attributed predominantly to lithium insertion and the concomitant reduction and extrusion of silver from the electrode structure; below 3 V, the electrochemical process was attributed predominantly to lithium insertion into the residual $Li_xMnO_y$ electrode structure with the concomitant reduction of the manganese ions. The reduced $Ag_xMnO_y$ electrode of Example 5 with nominal formula $Ag.MnO_{2-\delta}$ that had been prepared from a potassium permanganate precursor provided almost 50% of its theoretical capacity, indicating that the average oxidation state of the manganese ions in the starting electrode was close to 3.5; in this instance, therefore, the practical capacity of the $Ag.MnO_2$ electrode is significantly lower than that of Example 4 because it is compromised by the reduced Ag and manganese ions in the starting electrode; this electrode delivers almost all of its capacity below 3 V vs. metallic lithium as reflected by the open circuit voltage after the pulse (FIG. 7), as expected. The $Ag_xMnO_y$ electrode of Example 6 with nominal formula $AgMn_8O_{16}$, that had been synthesized by more conventional processing techniques, delivers 62% of its theoretical capacity, suggesting that the relatively low achieved capacity compared to the $Ag_xMnO_y$ electrode of Example 4 could be attributed to some reduced manganese in the electrode. In Example 6, therefore, the data show that average oxidation state of the manganese ions was >3.5, and close to 3.6.

From the data above, the applicants determined that optimum capacity of $Ag_xMnO_y$ electrodes will be achieved when the $Ag_2O$ content in the initial electrode is as high as possible and when the average manganese oxidation state is as close to 4 as possible. In this respect, this invention demonstrates that highly oxidizing permanganate precursors, such as $AgMnO_4$, can provide $Ag_xMnO_y$ electrodes with a high $Ag_2O$ content and a high manganese oxidation state, and that such electrodes show high capacity utilization in lithium electrochemical cells.

TABLE 1

Performance data of silver-manganese-oxide electrodes

| $Ag_xMnO_y$ Electrode Material | Theoretical Capacity (mAh/g) | Obtained Capacity (mAh/g) | Capacity Utilization (%) | Energy Density# (mWh/cm³) |
|---|---|---|---|---|
| Example 4 from $AgMnO_4$ | 264* | 230 | 87 | 2708 |
| Example 5 $Ag.MnO_{2-\delta}$ ($0 < \delta < 0.5$) | <267 | 128 | >48 | 1837 |
| Example 6 $AgMn_8O_{16}$ | 234 | 144 | 62 | 1831 |

Figure 9:
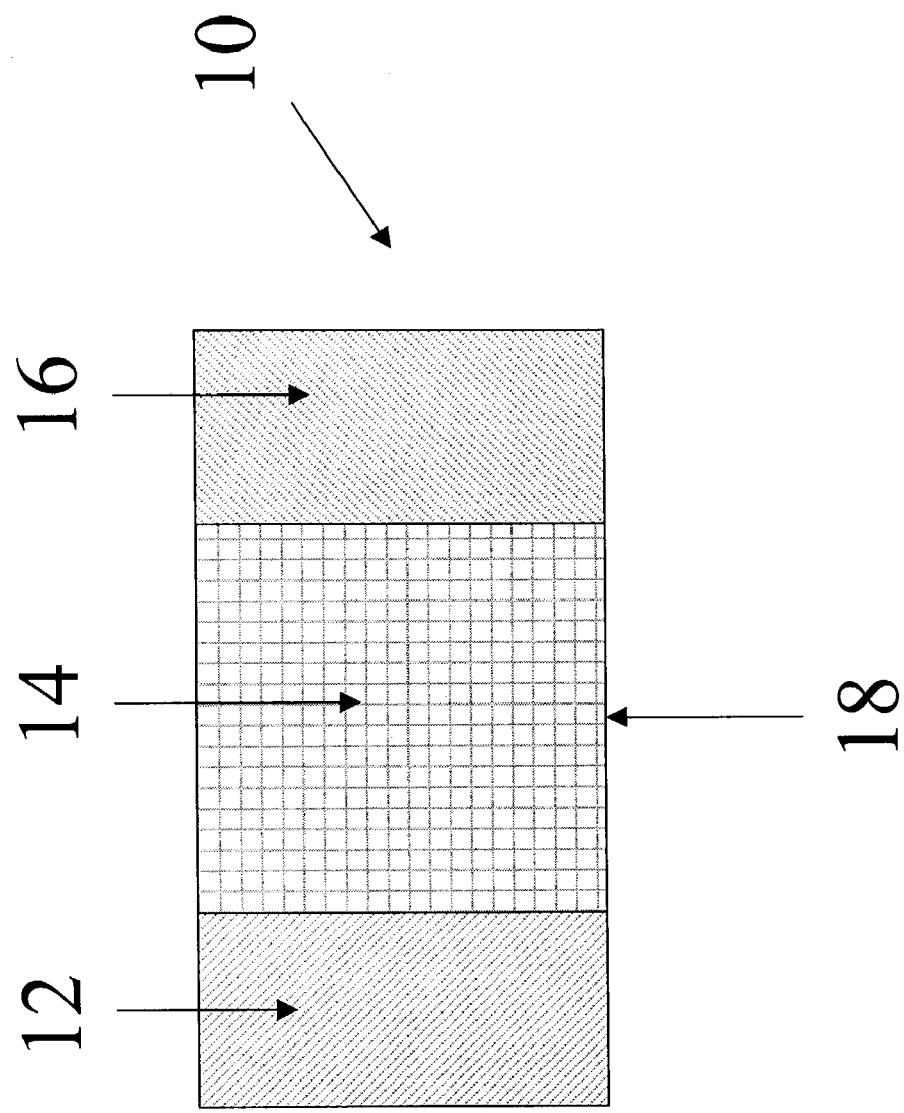
FIG. 9 is a schematic illustration of an electrochemical cell.
Figure 10:
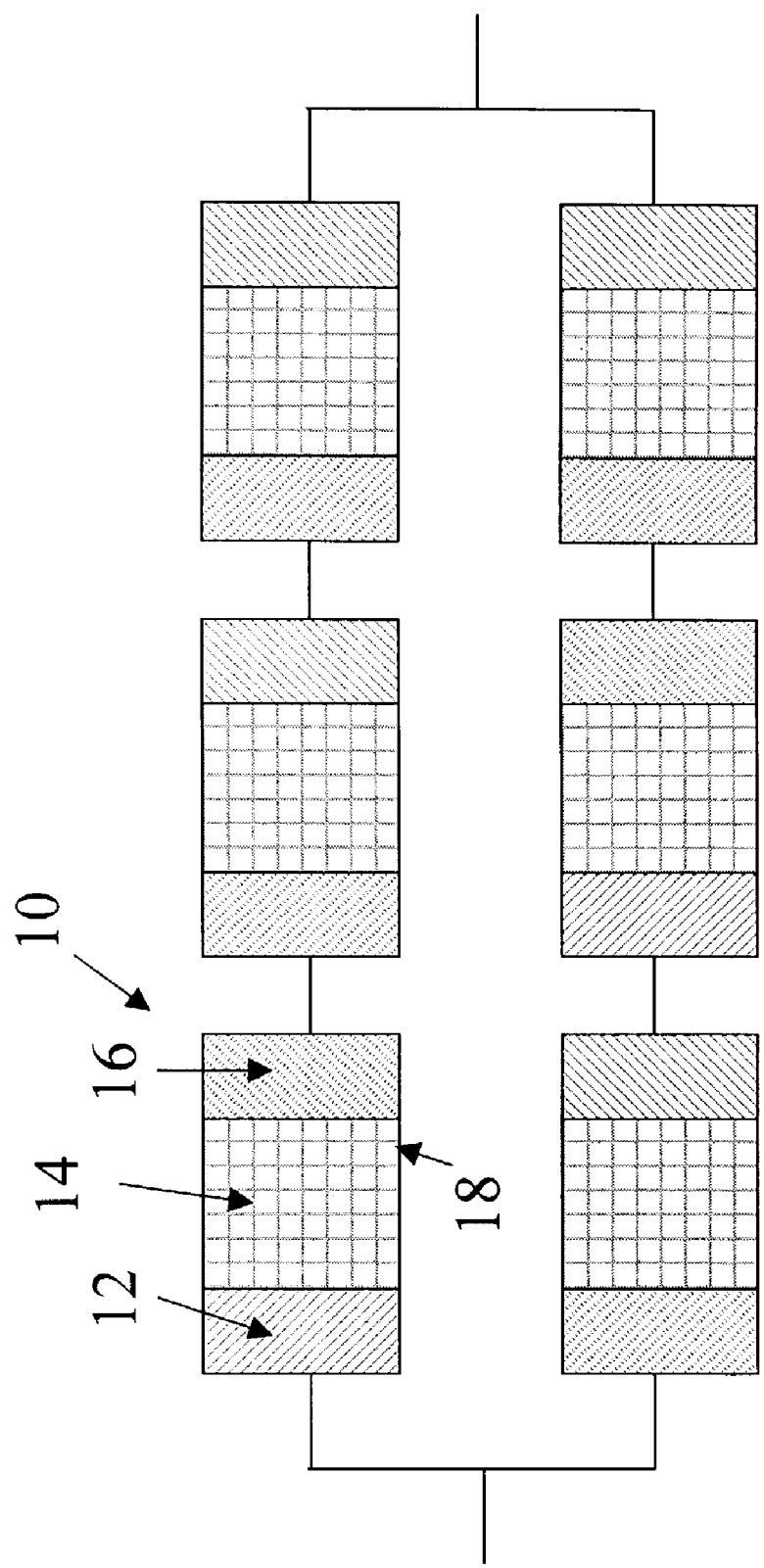
FIG. 10 is a schematic illustration of an example of a battery employing the cells of the invention.

*based on optimum composition $0.5\ Ag_2O.MnO_2$
based on the volume of the electrode and average cell voltage This invention, therefore, relates to a positive electrode for a non-aqueous electrochemical lithium cell, as shown schematically in FIG. 9, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 10 shows a schematic illustration of one example of a battery in which two strings of electrochemical lithium cells, described above, are arranged in parallel, each string comprising three cells arranged in series.

While particular embodiments of the present invention have been shown and described, it will be appreciated by those skilled in the art that changes, modifications and improvements may be made, for example in the processing of the materials or in the electrode and/or cell design without departing from the true spirit and scope of the invention.

The embodiments of the invention in which an exclusive property or privilege is claimed are defined as follows:

1. A non-aqueous lithium electrochemical cell including a silver manganese oxide positive electrode of $Ag_xMnO_y$, wherein x and y are such that the manganese ions in charged or partially charged electrodes have an average oxidation state greater than 3.5 and less than 4.0.

2. The silver manganese oxide positive electrode of claim 1, wherein the manganese ions oxidation state is greater than 3.8.

3. The silver manganese oxide positive electrode of claim 1, wherein the manganese ions oxidation state is greater than 3.9.

4. A positive electrode according to claim 1 in which the $Ag_xMnO_y$ electrodes are mixed with a silver powder current collector.

5. A positive electrode according to claim 1 in which the $Ag_xMnO_y$ electrodes are laminated onto a silver foil current collector.

6. A method for synthesizing a silver-manganese oxide positive electrode of $Ag_xMnO_y$ for a non-aqueous lithium electrochemical cell, in which x and y are such that the manganese ions in charged or partially charged electrodes have an average oxidation state greater than 3.5 and less than 4.0 comprising decomposing a permanganate precursor optionally in the presence of silver components or compounds and/or manganese components or compounds to form $Ag_xMnO_y$.

7. A method according to claim 6, in which the permanganate precursor is silver permanganate.

8. A method according to claim 6, in which the permanganate precursor is decomposed in contact with the electrolyte of the non-aqueous lithium cell.

9. A method according to claim 6, in which the permanganate precursor is selected from potassium permanganate, sodium permanganate and/or lithium permanganate and the silver compound if present is selected from silver nitrate and/or silver oxide.

10. A method according to claim 6, in which the silver containing compounds if present are selected from silver nitrate or silver oxide.

11. A method according to claim 6, in which the manganese compounds are selected from manganese nitrate, manganese sulphate and manganese dioxide.

12. A non-aqueous lithium electrochemical cell comprising a negative electrode, an electrolyte and a silver manganese oxide positive electrode of $Ag_xMnO_y$ for a non-aqueous lithium electrochemical cell, in which x and y are such that the manganese ions in charged or partially charged electrodes have an average oxidation state greater than 3.5.

13. A non-aqueous lithium battery comprising a plurality of electrically connected electrochemical cells, each cell comprising a negative electrode, an electrolyte and a silver manganese oxide positive electrode of $Ag_xMnO_y$ in which x and y are such that the manganese ions in charged or partially charged electrodes have an average oxidation state greater than 3.5 and less than 4.0.

* * * * *